United States Patent [19]
Bayliss et al.

[11] Patent Number: 5,326,160
[45] Date of Patent: Jul. 5, 1994

[54] HYDRAULIC SYSTEMS FOR VEHICLES

[75] Inventors: John P. Bayliss, Worcestershire; Sean Byrnes, Birmingham, both of England

[73] Assignee: Lucas Industries public limited company, England

[21] Appl. No.: 982,856

[22] Filed: Nov. 30, 1992

[30] Foreign Application Priority Data

Dec. 11, 1991 [GB] United Kingdom ............... 9126317
Dec. 11, 1991 [GB] United Kingdom ............... 9126319
Dec. 20, 1991 [GB] United Kingdom ............... 9127087
Mar. 30, 1992 [GB] United Kingdom ............... 9206882

[51] Int. Cl.$^5$ .............................................. B60T 8/34
[52] U.S. Cl. ........................ 303/113.2; 303/113.4; 303/116.1; 180/197; 364/426.03
[58] Field of Search ............... 303/113.2, 113.4, 115.4, 303/116.1, 117.1, 119.2, 105; 180/197; 364/426.01, 426.02, 426.03

[56] References Cited

U.S. PATENT DOCUMENTS

| | | | |
|---|---|---|---|
| 4,571,010 | 2/1986 | Dittner et al. | 303/113.2 X |
| 4,733,760 | 3/1988 | Inagaki et al. | 303/113.2 X |
| 4,915,459 | 4/1990 | Hashida et al. | 303/119.2 |
| 4,939,656 | 7/1990 | Hoashi et al. | 303/97 X |
| 4,950,028 | 8/1990 | Harrison | 303/113.2 |
| 5,096,016 | 3/1992 | Tada et al. | 180/197 |
| 5,131,730 | 7/1992 | Kollers et al. | 303/113.2 |
| 5,161,865 | 11/1992 | Higashimata et al. | 303/116.1 X |
| 5,169,214 | 12/1992 | Holzmann et al. | 303/113.2 |
| 5,169,215 | 12/1992 | Takata | 303/116.1 X |
| 5,188,435 | 2/1993 | Willman | 303/113.2 |
| 5,193,888 | 3/1993 | Okazaki et al. | 303/93 |

FOREIGN PATENT DOCUMENTS

| | | | |
|---|---|---|---|
| 0110539 | 6/1984 | European Pat. Off. | 303/119.2 |
| 2071749 | 4/1987 | Japan | 303/119.2 |
| 2241031 | 8/1991 | United Kingdom | 303/113.2 |
| 2242489 | 10/1991 | United Kingdom | 303/113.2 |

Primary Examiner—Robert J. Oberleitner
Assistant Examiner—Peter M. Poon
Attorney, Agent, or Firm—Laff, Whitesel, Conte & Saret

[57] ABSTRACT

In a hydraulic system for traction control, a pump is adapted to withdraw fluid from a reservoir through a master cylinder assembly under the control of a solenoid-controlled valve responsive to signals from an electronic control module, and a pressure-sensitive valve. The system is also provided with a solenoid-controlled flow control valve also responsive to signals from an electronic control module, a switch is responsive to movement of the throttle of the engine of a vehicle, and from which signals are transmitted to the control module. Thus, when the signal from the switch changes as the foot is released from the throttle pedal, the control module recognizes the change in signal and re-sets the modulator means, for example the solenoid-operated flow control valve.

12 Claims, 7 Drawing Sheets

HYDRAULIC SYSTEMS FOR VEHICLES

This invention relates to hydraulic systems for vehicles of the type having a front pair of wheels and a rear pair of wheels, of which first and second wheels of at least one pair are driven, and each wheel is provided with a hydraulically actuated brake, the system being of the kind comprising a hydraulic master cylinder assembly for applying all the brakes, a speed sensor for sensing the speed of rotation of each wheel, modulator means for modulating the supply of fluid from the master cylinder assembly to the brakes, and an electronic control module, which receives signals from the speed sensors and is operative to actuate the modulator means in turn to control operation of a respective wheel depending upon the nature and duration of the said signal, such as a signal indicative of an incipient lock of a brake wheel to achieve brake release or a signal indicative of drive slip (spin) of a driven wheel to apply a brake for traction control, and a pump is adapted to make up the volume of fluid dumped from a brake during an antilock mode so that the brake can be re-applied at a rate determined by the modulator means, and the pump is also adapted to provide the necessary pressure to operate a brake on a spinning wheel for traction control.

According to our invention, a hydraulic system of the kind set forth for a vehicle is provided with a throttle sensor responsive to movement of the throttle of the engine of the vehicle, and from which signals are transmitted to the electronic control module.

Thus, when the signal from the throttle sensor changes as the foot is released from the throttle pedal, the control module recognizes the change in signal and re-sets the modulator means so that the brakes can be re-applied fully.

When the modulator means comprises a solenoid-controlled valve, the electronic control module changes the mode of the solenoid, for example de-energizing it, to enable the flow valve to re-set, for example by means of a return spring.

The throttle sensor preferably comprises an electrical or electronic switch.

The throttle switch may be incorporated in a linkage between the throttle pedal itself and the injector or carburetor or carburetor, or it may co-operate directly with the throttle pedal or with a moving part of an injector or carburetor.

One embodiment of our invention as illustrated in the accompanying drawings in which FIG. 1 is a layout of a hydraulic system for a four wheel vehicle;

Figure 1:
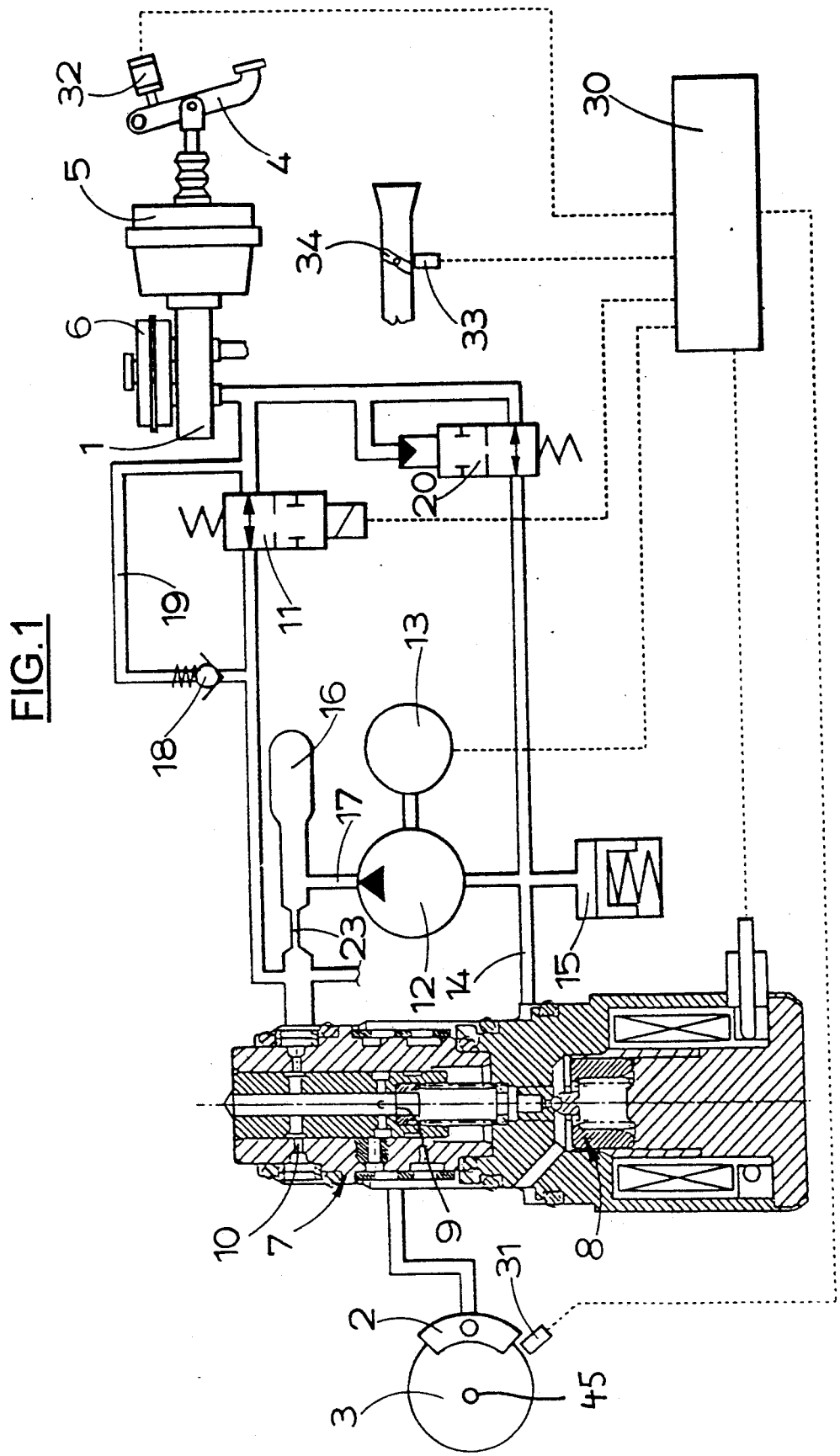

The hydraulic system illustrated in the drawings comprises a hydraulic master cylinder assembly 1 for applying brakes on driven front wheels of a vehicle of which only a brake 2 on one front wheel 3 is illustrated.

The front wheels are driven by an axle 45. The master cylinder assembly 1 is operated by a pedal 4 with the assistance of a pneumatic booster or servo motor 5. When operated fluid is displaced to the brake 2 from a pressure space in the master cylinder assembly 1 with the pressure space being supplied with fluid from a reservoir 6 at atmospheric pressure.

A brake pressure modulator means comprising a flow control valve 7 is located in the line between the master cylinder assembly 1 and the brake 2. The flow control valve 7 is of known construction being controlled by a first solenoid-controlled valve 8 and being provided with a restrictor 9 of fixed area and a restrictor 10 of which the area is variable in response to a pressure drop across the restrictor 9. The variable restrictor is defined by movement of a spool containing orifices relative to orifices in the wall of the bore in which it is guided to slide.

A second solenoid-controlled valve 11 is located in the line between the master cylinder assembly 1 and the flow control valve 7. The valve 11 is adapted to control communication between the master cylinder assembly 1 and the flow control valve 7. Communication between the master cylinder assembly 1 and the input side of a suction pump 12 is controlled through a normally open pressure-responsive isolator cut-off valve 20. The valve 20 is adapted to be closed by pressure from the master cylinder assembly 1 in order to isolate the pressure space of the master cylinder assembly 1 from the pump 12. The pump 12 is adapted to be driven by an electric motor 13. The pump 12 is also connected to a dump line 14 from the brake 2 and an expander chamber 15 in that line. The pump 12 is adapted to pump fluid to the restrictor 9, with an attenuator chamber 16 and a restrictor 23 being disposed in a delivery line 17.

A high pressure check valve 18 set substantially at 150 bar is disposed in a by-pass return line 19 back to the master cylinder assembly 1. The return line 19 by-passes the solenoid-controlled valve 11.

Figure 3:
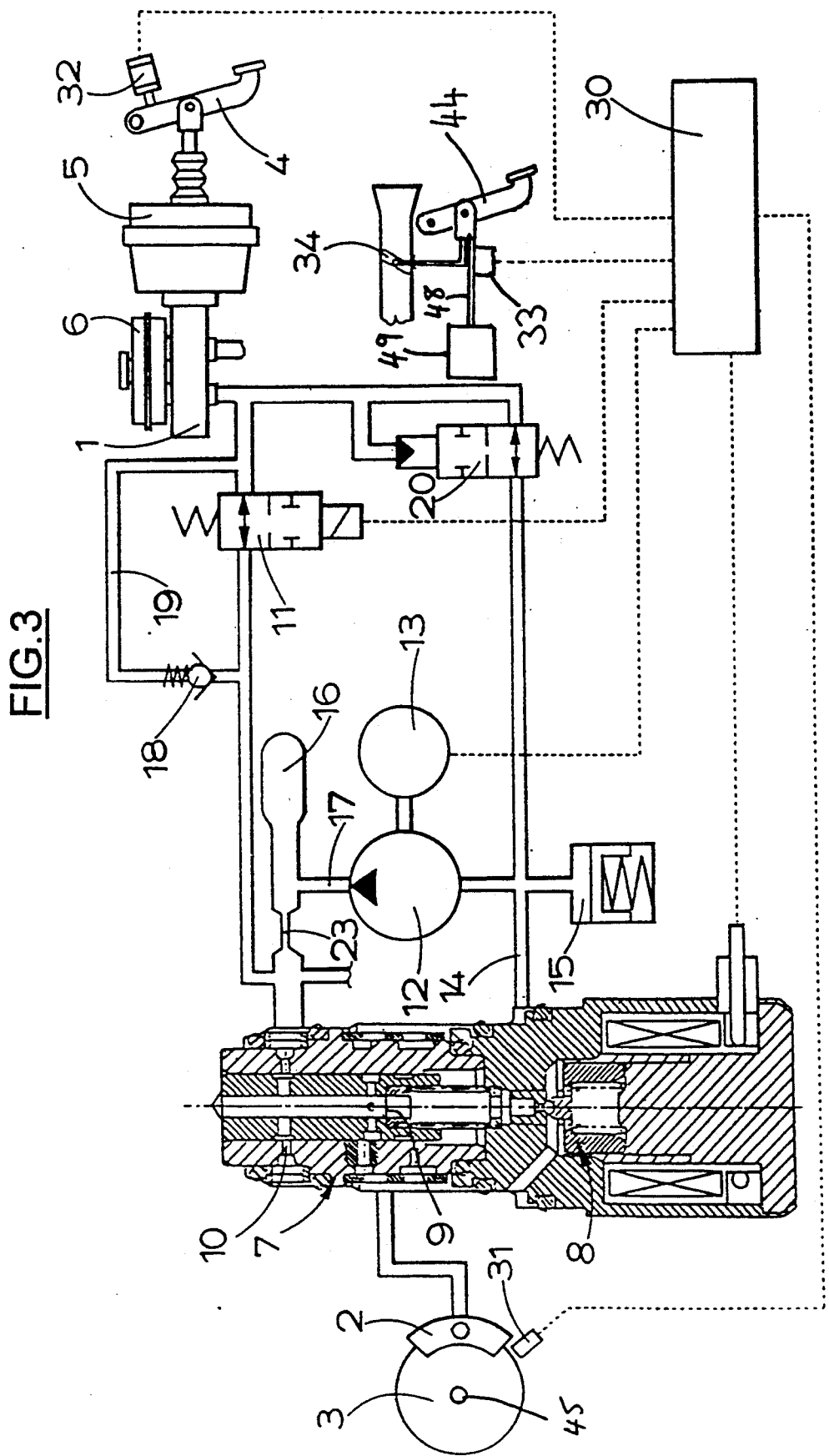
FIG. 3 is a layout similar to FIG. 1 but showing a modification.
Figure 4:
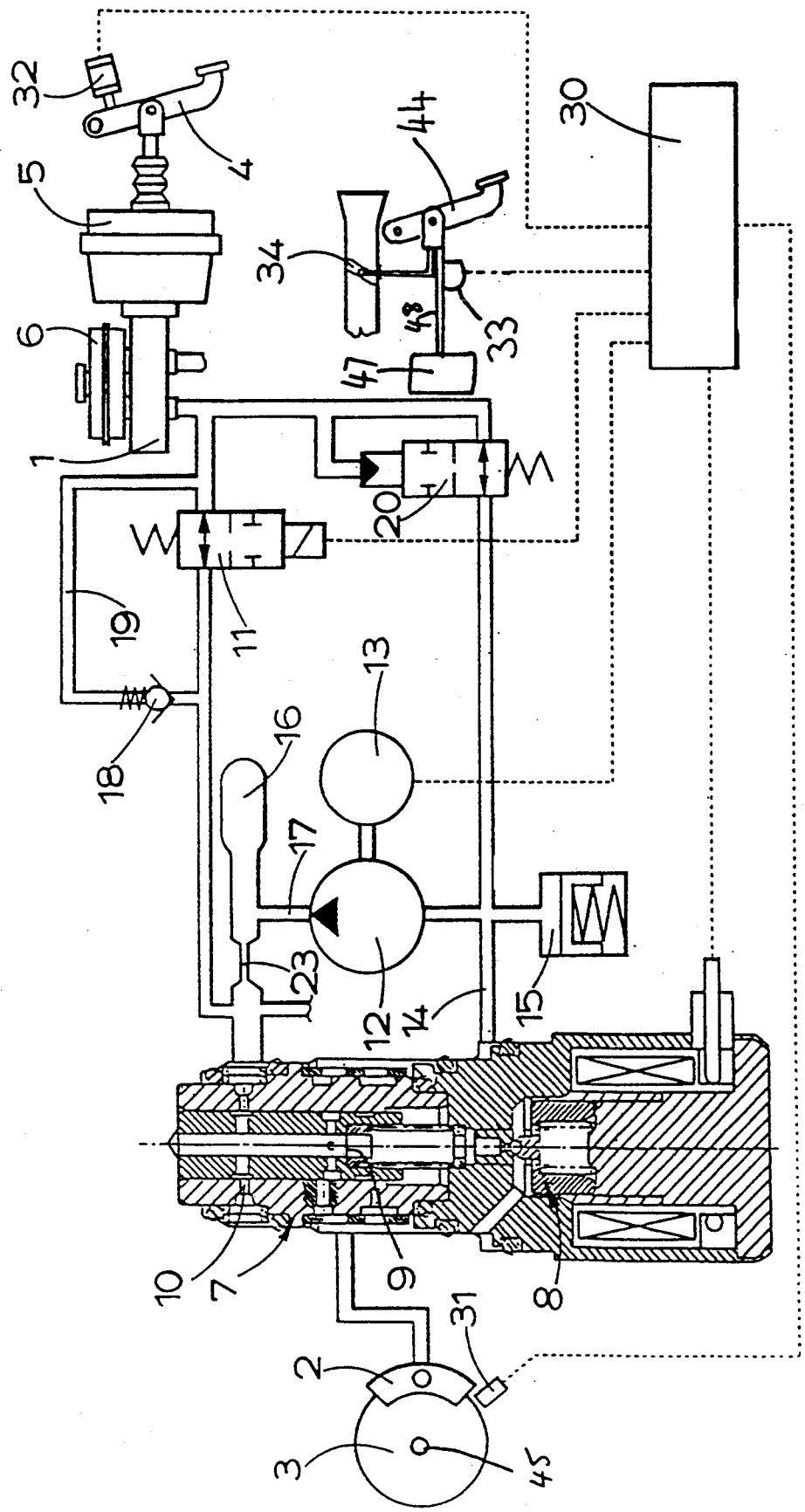
FIG. 4 is a layout similar to FIG. 1 but showing a modification.
Figure 5:
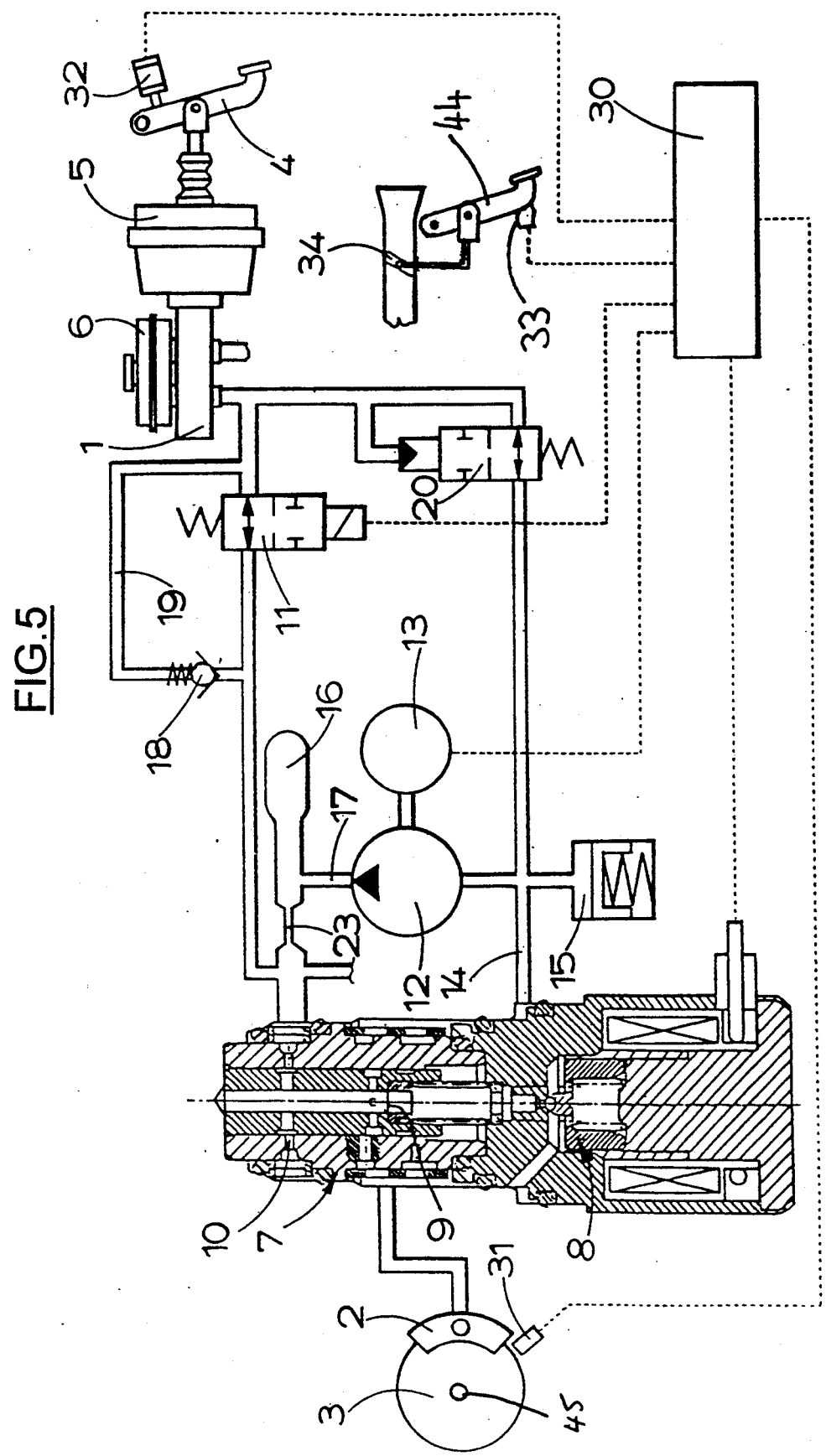
FIG. 5 is a layout similar to FIG. 1 but showing a modification.
Figure 6:
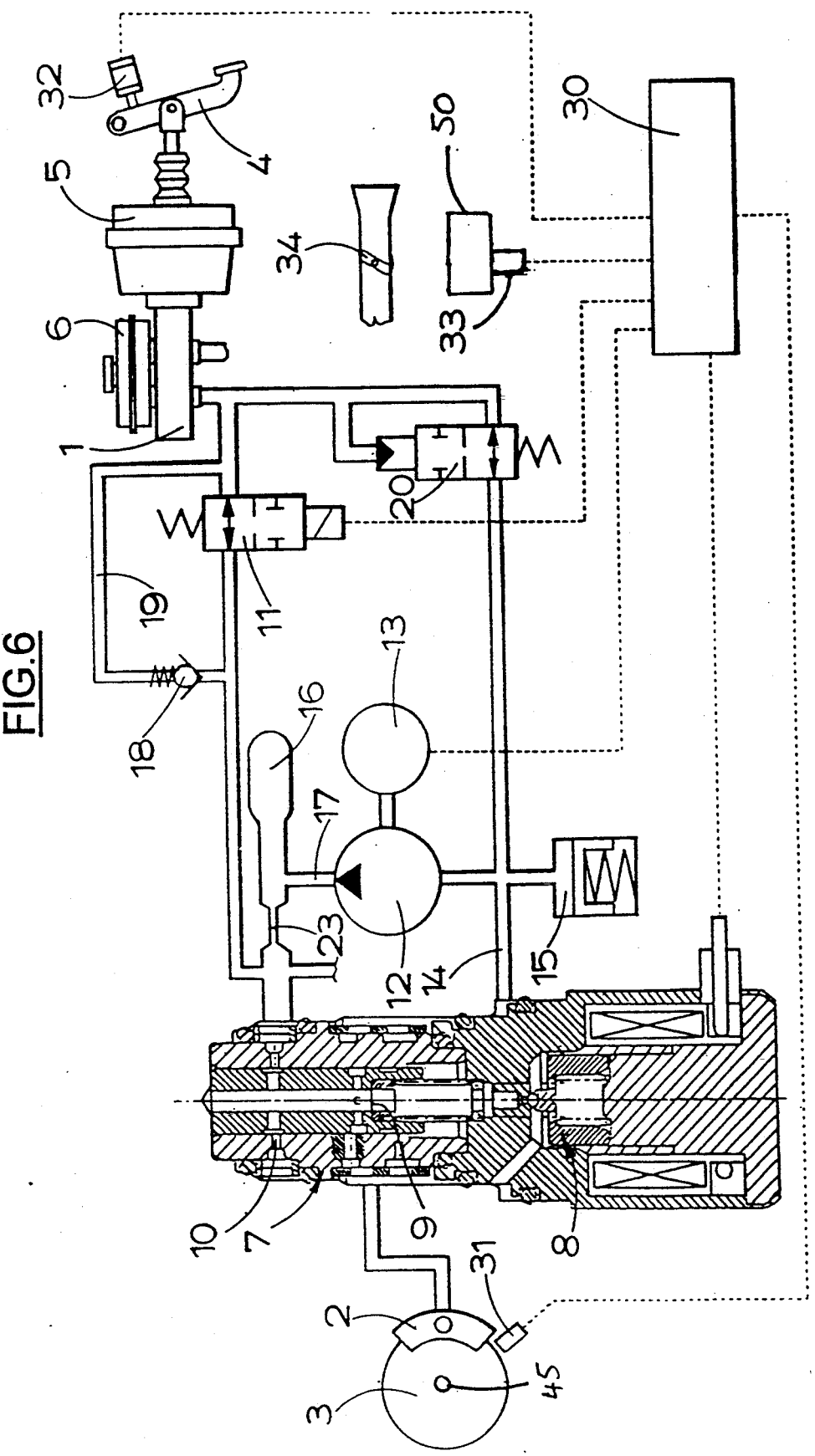
FIG. 6 is a layout similar to FIG. 1 but showing a modification.
Figure 7:
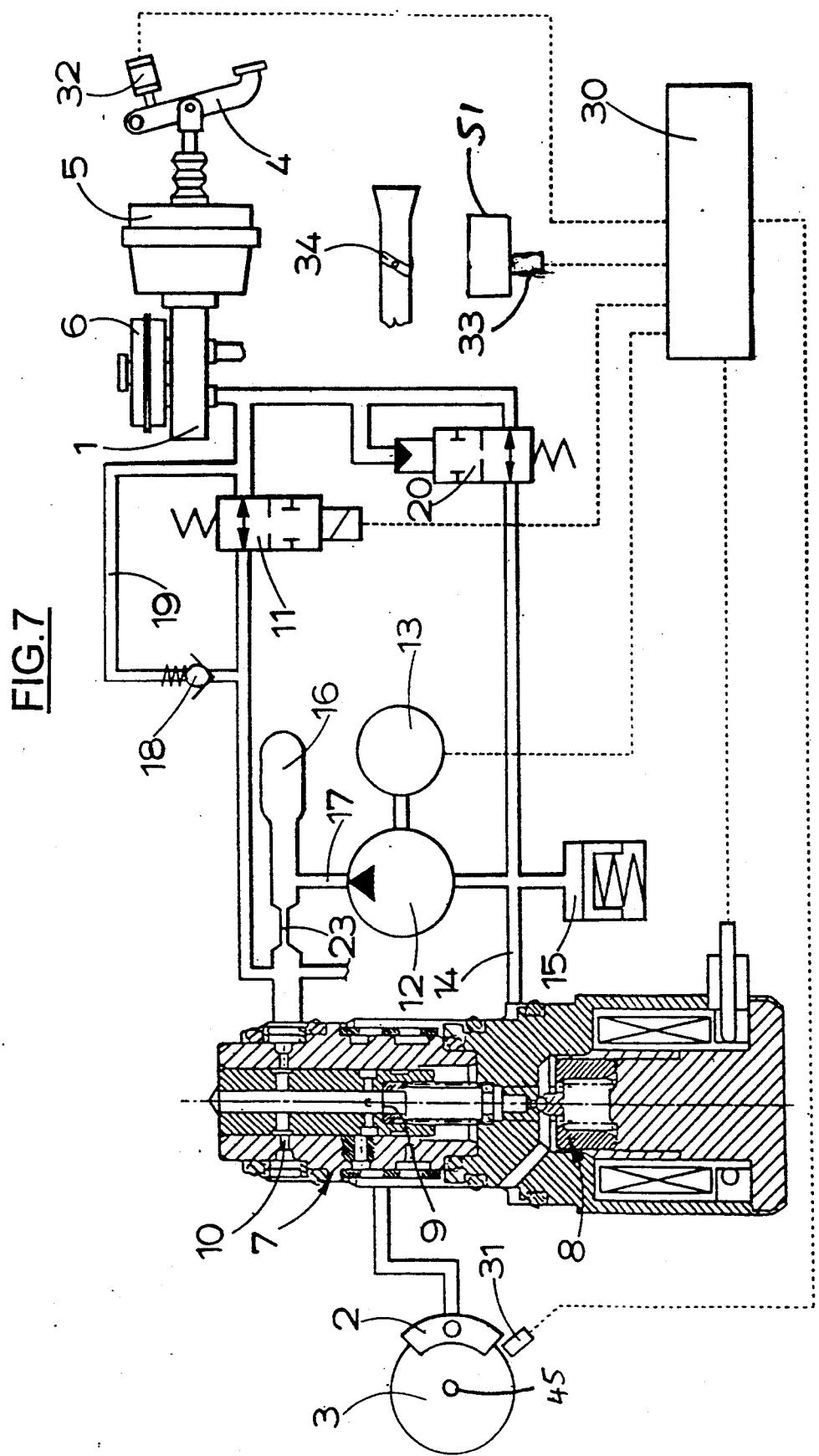
FIG. 7 is a layout similar to FIG. 1 but showing a modification.

An electronic control module 30 is adapted to receive signals from a wheel speed sensor 31, which indicates the behaviour of the wheel 3, whether braked or unbraked, from a switch 32 responsive to operation of the pedal 4, and from a sensor responsive to movement of the throttle 34 of the engine of the vehicle, suitably an electrical or electronic switch 33. The switch 33 may be incorporated in a linkage 48 between the throttle pedal 46 itself and either a control unit 49 for the injectors (as shown in FIG. 3) or carburetor 47 or carburetors (as shown in FIG. 4), or it may co-operate directly with the throttle pedal 44 (as shown in FIG. 5), or with a moving part 50, 51 of an injector control unit 49 (as shown in FIG. 6) or carburetor 47 (as shown in FIG. 7). In response to such signals the electronic control module 30 emits electric currents to energize solenoids of the solenoid-controlled valves 8 and 11 in a manner and in a sequence to be described.

In a normal inoperative position of the system the solenoids of the valve 8 and 11 are de-energized. The valve 8 is closed by the action of a spring urging a valve member against a valve seating, and the valve 11 is open. The motor 13 is also switched off. When the engine is running, a signal is transmitted from the switch 33 to the control module 30, at least when the throttle 34 is displaced from tick-over.

When the pedal 4 is displaced to operate the master cylinder assembly 1, a signal is sent to the control module 30 from the switch 32. Fluid is also displaced from the pressure space to the brake 2 through the open second solenoid-controlled valve 11, and the flow control valve 7 which is open because of closure of the solenoid valve 8. Flow through the flow control valve 7 is therefore unrestricted. The fluid pressure from the master cylinder assembly 1 acts in direction to close the isolator valve 20 thereby isolating the master cylinder assembly 1 from the pump 12 and the expander chamber 15.

When the electronic control module 30 recognises that the signal from the sensor 31 indicates the approach of a wheel lock, it energizes the solenoid of the valve 8. This opens the valve 8 withdrawing the valve member from the valve seating against the force in the spring, in turn allowing the flow control valve 7 to close and isolate the brake 2 from the master cylinder assembly 1, with fluid to the brake 2 being dumped to the expander chamber 15 through the dump line 14. The control module 30 starts the motor 13 to drive the pump 12, and the pump 12 withdraws fluid from the chamber 15 and pumps it back into the master cylinder circuit in a known manner, through the attenuation chamber 16 and the fixed restrictor 23.

When the wheel has recovered, the control module 30 permits the valve 8 to close, and the brake 2 is re-applied at a controlled rate determined by the flow-control valve 7 and the area of the variable orifice.

When the electronic control module 30 detects that the wheel 3 is spinning it starts the motor 13, and energizes the solenoid of the valve 11 to close that valve and isolate the master cylinder assembly 1 from the flow control valve 7. The master cylinder assembly 1 is placed in communication with the low pressure side of the pump 12 through the isolator valve 20 which is in a normal open position due to lack of pressure in the pressure space. The suction pump 12 withdraws fluid from the reservoir 6 only, since no fluid is present in the expander chamber 15. This fluid is withdrawn through the pressure space in the master cylinder assembly 1 and is pumped to the flow control valve 7 to apply the brake 2. This stops the wheel spinning, at a rate determined by flow through the flow control valve 7, to achieve traction control.

In order to control the spinning wheel 3 the brake 2 may need to be applied and released several times. This is achieved in the same manner as for anti-lock control. The solenoid of the valve 8 is energized to release the applied brake fluid to the expander chamber 15. The pump 12 now takes the source of dumped fluid from the expander chamber 15 and re-applies it to the brake 2 at a rate determined by the flow control valve 7. The procedure will occur as long as traction control is required for that particular wheel 3, during one complete traction control application.

If for any reason the system is stiff, for example if the flow control valve 7 is latched in a position of minimum flow, any excess pressure fluid is fed back to the low pressure side of the pump 12 through the high pressure check valve 18, and the isolator valve 20.

At the end of a traction control application the solenoid controlled valves 11 and 8 are de-energized. This allows any applied brake fluid in the brake 2 to be returned to the master cylinder assembly 1 via the now open solenoid controlled valve 11. Any excess fluid in the expander chamber 15 is pumped back to the master cylinder assembly 1 using the pump 12.

The process of returning the applied fluid back to the master cylinder assembly 1 takes a short period of time, especially so if the spool of the flow control valve 7 is in the restricted position.

Thus if the brakes are applied when a traction control operation as described above is in progress, the signal from the switch 33 changes as the throttle 34 is released and the foot transferred to the pedal 4. The change in signal from the switch 33 is recognized by the control module 30 which instantly de-energizes the solenoid controlled valves 11 and 8 allowing time for the flow control valve 7 to re-set before the foot is transferred to the pedal 4. This enables the flow control valve 7 to re-set into a fully open position in less than a period of, say, 100 milli-seconds which it takes the driver to transfer his foot from the throttle pedal to the brake pedal 4. Thus the control valve 7 is re-set before the foot is transferred to the pedal 4 so that the master cylinder assembly 1 is re-connected directly to the brakes before it is operated by the pedal 4.

After the brakes are released the pump 12 operates momentarily to scavenge fluid from the expander chamber 15.

In the system described above with reference to FIG. 1 of the drawings it is essential for the isolator valve 20 to close rapidly and effectively during normal braking in order to prevent any fluid being released to the expander chamber 15. It will be appreciated that should any fluid be released to the expander chamber 15 in this manner then the effective volume of the expander chamber 15 will be reduced. Any remaining volume may be insufficient to accommodate fluid released from the brakes during anti-lock control, and such anti-lock control may therefore be inhibited.

Figure 2:
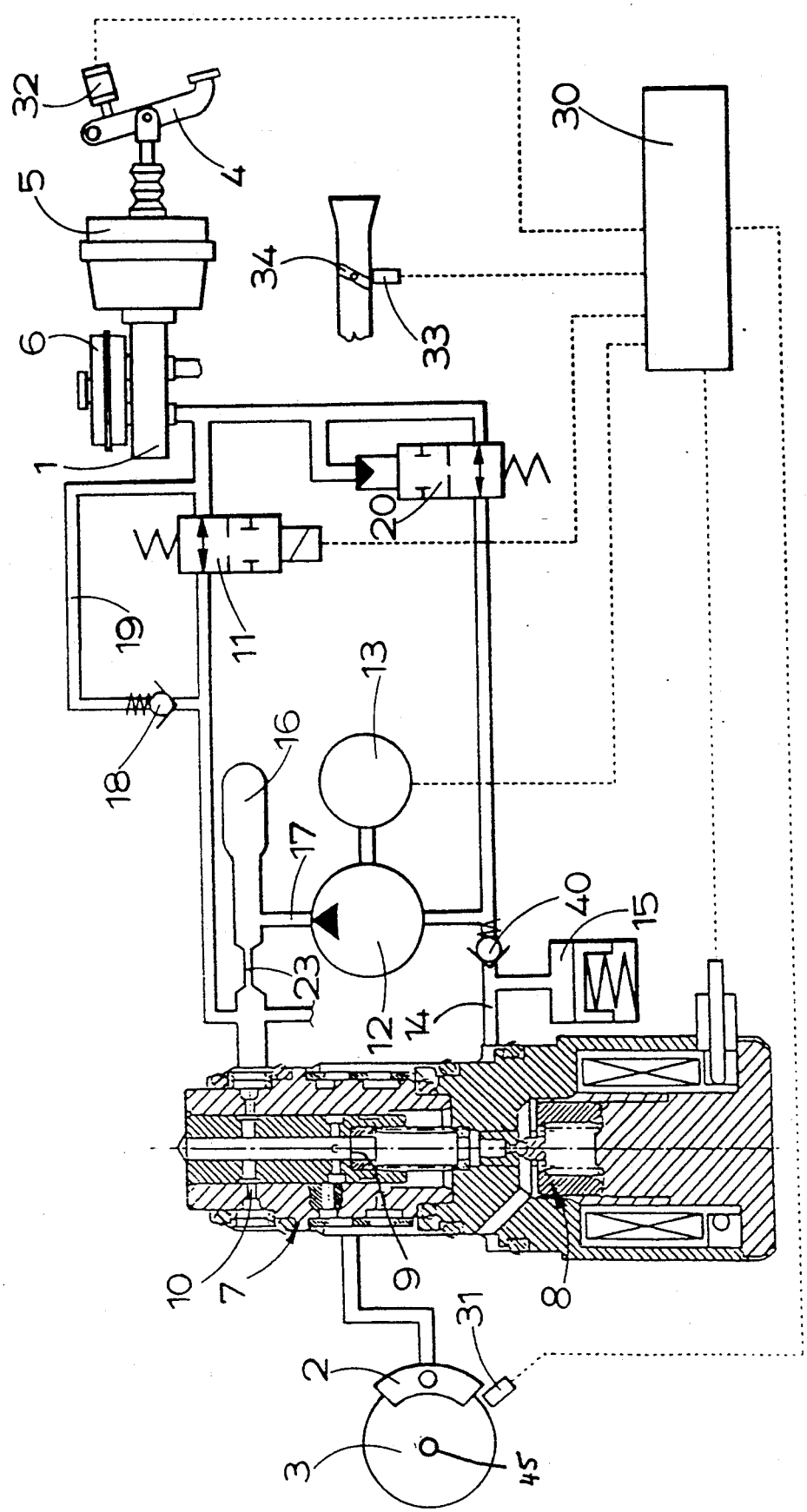
FIG. 2 is a layout similar to FIG. 1 but showing a modification.

Any such tendency is avoided in the modified system illustrated in the layout of FIG. 2 of the drawings. As illustrated the connection between the expander chamber 15 and the dump line 14 is positioned downstream of the inlet side of the pump 12 between the pump 12 and the solenoid valve 8, and a one-way valve 40 is located in the dump line 14 between the pump inlet and the expander chamber 15.

The one-way valve 40 prevents any fluid which may leak through the isolator valve 20 from entering the expander chamber 15. Thus the effective volume of the expander chamber 15 is maintained at a maximum, thereby ensuring that anti-lock control will not be inhibited.

The construction and operation of the system of FIG. 2 is otherwise the same at that of FIG. 1 and corresponding reference numerals have been applied to corresponding parts.

We claim:

1. An hydraulic system for a vehicle of the type having a throttle for an engine controlled by a pedal, a front pair of first and second wheels and a rear pair of first and second wheels, means for driving said first and second wheels of at least one of said pairs, and a hydraulically actuated brake provided on each wheel of said wheels, the system comprising a hydraulic master cylinder assembly for applying all said brakes, a speed sensor for each said wheel for sensing the speed of rotation of each said wheel, modulator means for modulating the supply of fluid from said master cylinder assembly to said brakes, an electronic control module which receives signals from the speed sensors and incorporates means operative to actuate said modulator means in turn to control operation of a respective one of said wheels depending upon the nature and duration of the said signal, a pump adapted to make up a volume of fluid dumped from at least one of said brakes during an anti-lock mode whereby the said one brake can be re-applied at a rate determined by said modulator means, said pump also being adapted to provide necessary pressure to operate a brake on one of said driven wheels for traction-control to correct spinning of that wheel, and a throttle sensor responsive to movement of said throttle and from which signals are transmitted to said electronic control module, whereby said signals from the throttle sensor changes as a foot is released from said throttle pedal, and means incorporated in said control module is adapted to recognise the said change in said signals form said throttle sensor and re-set said modulator means whereby said brakes can be re-applied fully.

2. A system according to claim 1, wherein said modulator means comprises a flow control valve controlled by a solenoid-controlled valve, and wherein said flow valve is adapted to be re-set when the control module changes the mode of a solenoid of said solenoid-controlled valve.

3. A system according to claim 2, wherein said solenoid-controlled valve comprises a valve member, a seating, a spring urging said valve member against said seating, and said solenoid adapted to be energized to urge said valve member away from said seating against the load in said spring, and wherein said control module is adapted to de-energize said solenoid to allow said valve member to engage with said seating, in turn enabling said flow valve to re-set.

4. A system according to claim 1, wherein said throttle sensor comprises an electrical switch.

5. A system according to claim 1, wherein said throttle sensor comprises an electronic switch.

6. A system according to claim 1, wherein said throttle sensor is incorporated in a linkage between said throttle pedal itself and an injector control unit.

7. A system according to claim 1, wherein said throttle sensor is incorporated in a linkage between said throttle pedal itself and a carburetor.

8. A system according to claim 1, wherein said throttle sensor co-operates directly with said throttle pedal.

9. A system according to claim 1, wherein said throttle sensor co-operates with a moving part of an injector control unit.

10. A system according to claim 1, wherein said throttle sensor co-operates with a moving part of a carburetor.

11. A system according to claim 1, incorporated an expander chamber, wherein a pressure-responsive isolator cut-off valve is adapted to be closed by pressure from said master cylinder assembly in order to isolate said master cylinder assembly from said pump when said master cylinder assembly is operated, and to prevent release of any fluid to said expander chamber into which fluid is dumped from said brake during an anti-lock mode.

12. A system according to claim 11, wherein a connection between said expander chamber and a dump line from the modulator means is positioned downstream of an inlet side of the pump between the pump and a solenoid valve, and a one-way valve is located in said dump line between the inlet side of the pump and the expander chamber.

* * * * *